Figure 1:
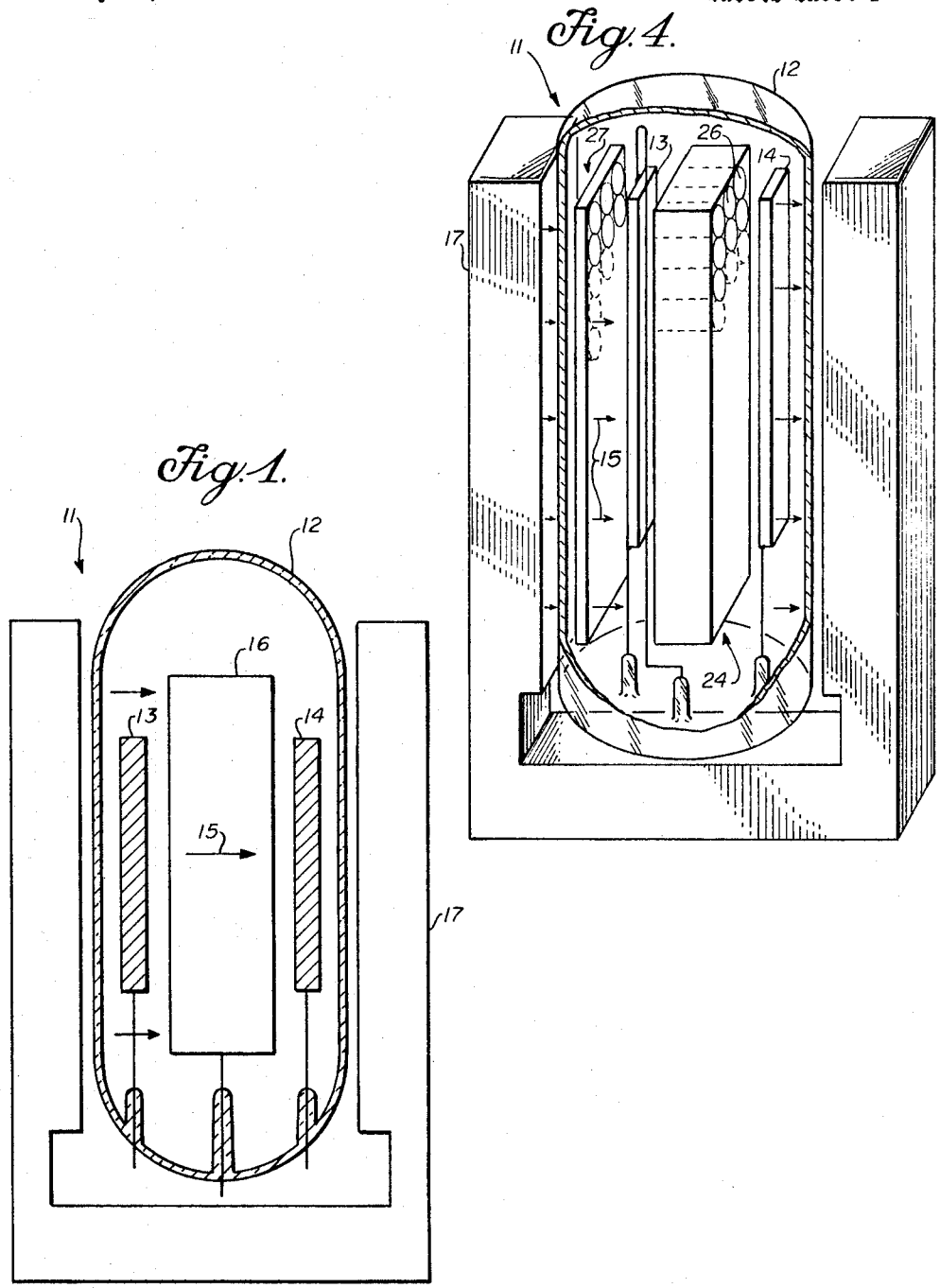

Aug. 16, 1966   R. FOX   3,267,307
MAGNETICALLY CHANNELED PLASMA DIODE HEAT CONVERTER
Filed May 13, 1963   2 Sheets-Sheet 2

INVENTOR.
RAYMOND FOX
BY
ATTORNEY

United States Patent Office

3,267,307
Patented August 16, 1966

1

3,267,307
MAGNETICALLY CHANNELED PLASMA DIODE HEAT CONVERTER
Raymond Fox, Rehovot, Israel, assignor to the United States of America as represented by the United States Atomic Energy Commission
Filed May 13, 1963, Ser. No. 287,167
6 Claims. (Cl. 310—4)

The invention described herein was made in the course of, or under, Contract W-7405-ENG-48 with the United States Atomic Energy Commission.

The present invention relates generally to thermionic energy converters, and, in particular to a magnetically channeled plasma diode converter having a conversion system which minimizes radiation losses therein.

In the field of heat-to-electricity conversion, the most promising direct conversion system at the present time is the thermionic energy plasma diode converter. Although there are various thermionic converters of varying configurations and theories of operation which are employed and operated in experimental studies, there is yet to be constructed a practical, fairly efficient converter for use in the field of space travel, for example. One of the major problems in evidence in the operation of such experimental converters is that a major portion of the energy input therein is lost by radiative and conductive heat losses. More particularly, the primary energy loss of the hot cathode to the cold anode is due to radiation losses. In the event such radiation from the hot cathode to the cold anode can be minimized, there results an increase of efficiency of the diode converter; such increase being on the order of a factor of five to ten.

The present invention presents a relatively simple means for increasing the efficiency in a converter by overcoming the majority of the inherent radiation loss therein from the cathode to the anode.

Therefore, it is an object of the present invention to provide a thermionic energy converter with relatively high efficiency.

It is another object of the present invention to provide an improved heat-to-electricity conversion system, wherein radiation losses are reduced by a factor of ten in comparison with the radiation losses of present-day experimental converters.

It is yet another object of the present invention to provide a thermionic energy converter employing a magnetic field and a permeable heat shield to minimize the radiant power loss from the cathode to the anode within the converter.

It is a further object of the present invention to provide a heat shield apparatus which will channel the electron flow from the cathode to an anode in a thermionic converter while minimizing the radiating heat transfer therebetween.

Another object of the present invention is to provide a means of minimizing the radiative energy losses from the hot cathode to the relatively cool anode in a thermionic energy converter.

It is a still further object of the invention to provide an energy conversion system for use in space travel with attendant efficiency approaching that of Carnot.

Figure 2:
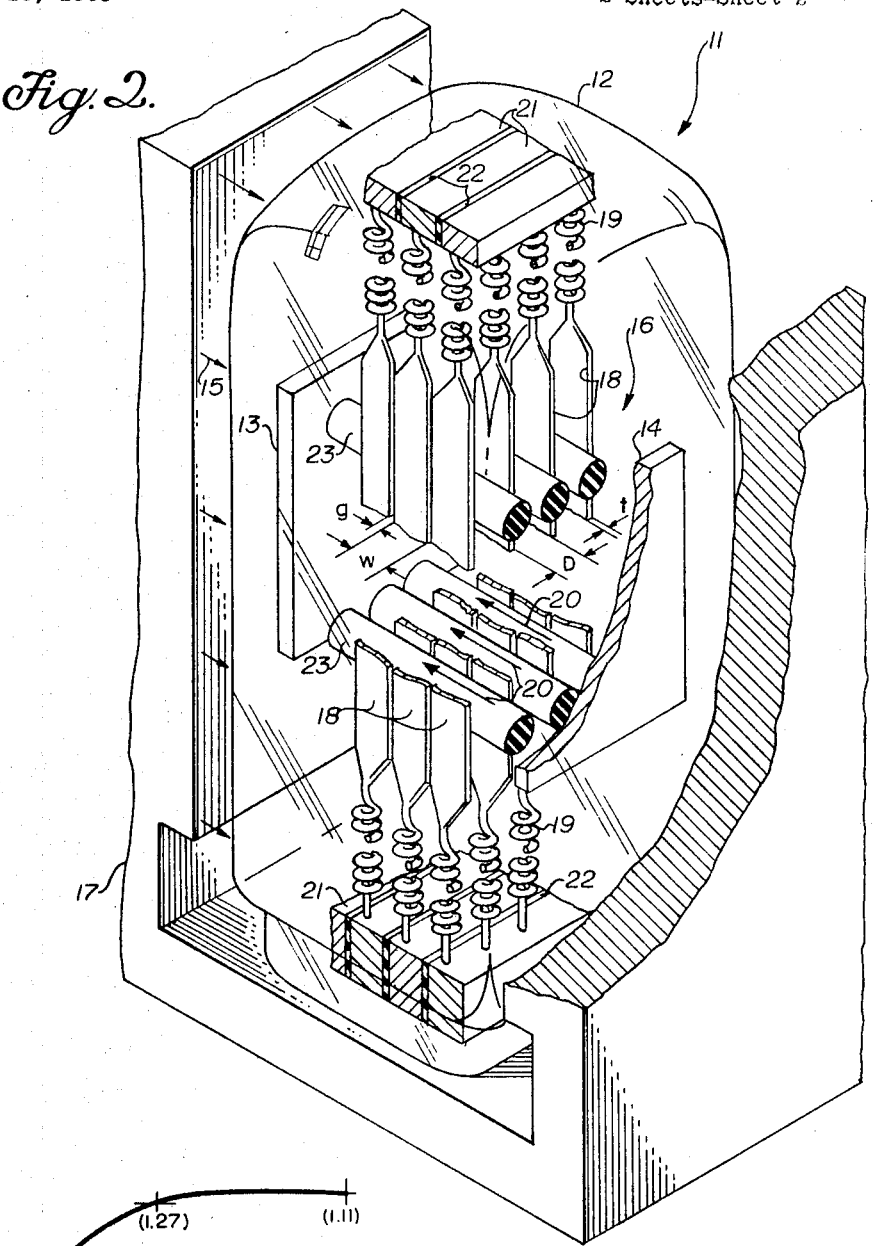

Other objects and advantages will be apparent in the following description and claims, considered together with the accompanying drawing, in which FIGURE 1 is a cross-sectional schematic view of a thermionic heat converter in accordance with the present invention, exemplifying the general construction with relation to the heat shield therein, FIGURE 2 is a detailed perspective view of a preferred embodiment of the present invention,

2

Figure 3:
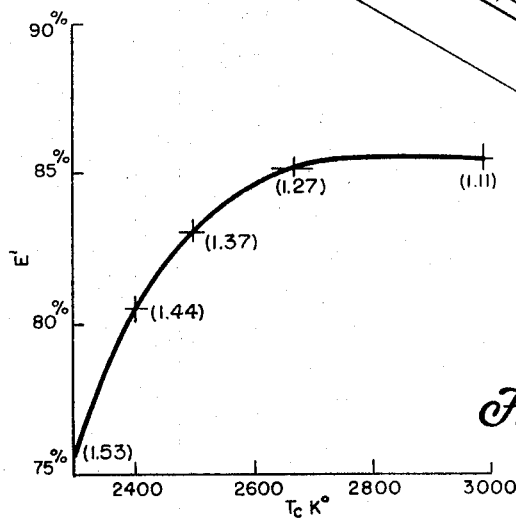

FIGURE 3 is a plot of efficiency, E', versus cathode temperature $T_c$ (K.°) in a thermionic converter employing the concept of the present invention, and FIGURE 4 is a cross-sectional, schematic view of a modified embodiment of the present invention.

Referring now to FIGURE 1, there is shown a heat-shielded, magnetically channeled, plasma heat converter 11, including an outer envelope 12 within which are oppositely mounted a cathode 13 and an anode 14. Cesium vapor is sealed within the envelope 12 by suitable means as is well known in the art. The cathode 13 and anode 14 are constructed of a fairly high work-function material, preferably tantalum or tungsten. Upon heating the cathode by a suitable heat source (for example, an exterior heat source or an exterior nuclear heat source such as a nuclear reactor, not shown), the cesium vapor is deposited in a partial coating on the hot surface of the cathode 13 to thereby reduce the cathode work function in a manner known in the art. A permeable heat-shield assembly 16 is disposed between the cathode 13 and anode 14, and a magnet 17 is arranged about the converter 11 such that a homogeneous magnetic field (depicted by field lines 15) created thereby extends normal to the facing cathode and anode surfaces and along channels in the permeable heat-shield assembly 16. Magnet 17, in a practical converter, may be either a permanent magnet or an electromagnet. The electromagnet configuration, as utilized for space travel applications, is feasible as only a few percent of the electrical power output need be used for the magnetic field generation.

In FIGURE 2, converter 11 comprises the cathode 13, the anode 14, envelope 12, and the magnet 17. It is to be understood that although the heat-shield assembly 16, further described infra, is herein presented in two particular geometries, there are possible many efficient geometric heat-shield arrangements based on the principle taught by the present invention. The heat-shield assembly 16 itself is formed of separated banks of frames of thin, closely spaced, long, narrow, foils or ribbons 18 aligned with their planes perpendicular to the cathode 13 and anode 14 surfaces, to thus form a plurality of parallel channels (depicted by narrows 20) extending the length of the interelectrode spacing. The ribbons 18 are formed of a refractory metal preferably tantalum, of proper dimensions. A coil spring 19 is attached to either end of each ribbon 18, and such springs 19 are in turn secured to support plates 21 which in turn are mounted parallel to the surfaces of the cathode and anode. Springs 19 provide continuous spring tension upon ribbons 18, and thereby hold each ribbon taut to compensate for the thermal expansion therein, due to temperature changes within the converter. The combination of one bank of ribbons 18 and springs 19, strung between two support plates 21, constitutes, a frame wherein a plane passing through such frame lies perpendicular to the homogeneous magnetic field (lines 15) created by the magnet 17 and perpendicular also to planes passing through the ribbons 18. A multiplicity of such frames are mounted, side by side, along the length of the interelectrode spacing between the cathode and anode to thus align the ribbons and form the multiplicity of parallel channels 20 of previous mention. Such frames must be insulated one from the other; therefore, an aluminum oxide layer 22 is sprayed on the facing surfaces of the support plates 21 by a plasma jet to provide not only the insulation, but also to provide a control of the spacing between the plates, and thus the interframe spacing. Upon assembly, the frames are accurately indexed and rigidly clamped together, the assembly 16 to be thereafter mounted by means of suitable supports within the diode converter 11. Thus, each frame of supported ribbons 18, mounted perpendicular to the homogeneous magnetic-field lines 15, is thermally and electrically isolated from successive frames. Ceramic rods 23 are disposed parallel and coplanar along the channels 20 near the ends of the ribbons 18 to thereby constrain the ribbons to their proper planes.

In a typical converter (FIGURE 2), the channel width or distance between ribbon planes is D, the interelectrode spacing between the surfaces of cathode 13 and anode 14 is L, the average ribbon spacing or distance between adjacent ribbon edges in banks is $g$, and the ribbon width is $w$. The ratio, $g/w$, is much less than 1. The ribbons can occasionally touch across the gap, $g$, without seriously affecting proper operation, for total conduction will be sufficiently low that it can be neglected when compared with the radiant power transfer. It is preferable that the ratio, $r$, of the channel width, D, to the interelectrode spacing, L, has the condition $$r = D/L \ll 1 \qquad (1)$$

In operation, electrons are emitted from the heated cathode 13 to flow therefrom to the anode 14. Such electrons follow the magnetic field lines 15 created by magnet 17 and define helical paths with electron cyclotron radii of curvature small compared to the channel width, D, of the heat-shield assembly 16. The ions necessary for space charge neutralization are provided by surface ionization of the ambient vapor at the cathode 13 surface (although the ions may also be provided by auxiliary ion injection). The average ion cyclotron radius is much greater than that of the electron; hence, the electrons are strongly collimated by the magnetic field created by magnet 17, while the ions are negligibly affected. The heat-shield assembly 16 is biased positive with respect to the cathode 13 and the anode 14 surfaces to reduce positive ion loss, and, in conjunction with the homogeneous magnetic field, channels the electrons as mentioned above.

Since a portion of the heat-shield assembly 16 nearest the cathode 13 will assume the temperature thereof, the ambient vapor will also become ionized on the ribbons within such portion. The vapor will coat the anode 14 and the remaining cool portion of the heat-shield assembly 16 ribbons 18, thereby depressing the work functions of these surfaces. If ions arrive at these low work-function surfaces, they will be re-emitted as atoms. A positive bias, of previous mention, placed on the low work-function surfaces reduces the number of ions impinging on these surfaces.

The surface potential, $V_p$, of the heat-shield ribbons 18 is kept at the cathode potential when the ratio, R, of ions to neutrals emitted from the surface is very much less than 1. The ribbons are biased to a potential $(V_p - V_c)$ positive with respect to the cathode surface when $R \gg 1$, where $V_c$ is the work function depression of the surface caused by partial cesium coverage, and $V_p$ is the bare surface potential of the heat shield ribbons. This bias is the minimum necessary to make the potential everywhere inside the channels of the heat-shield assembly 16 always positive or equal to zero. The surface potentials of the cathode 13 and anode 14 are assumed equal for optimum power output.

Further, it is assumed that collisions are negligible and that the temperature of the ions is approximately $T_c$, the temperature of the cathode. In the region of the heat-shield assembly 16 where $R \ll 1$, all ions of energy greater than $eV_p$ are absent, since they have reached the heat shield and have become neutralized (where e is the electronic charge).

Various theoretical formulas and equations relating to the radiant power transfer from various elements within the converter, as well as derivations for obtaining the surface potential of the heat shield, are available, but due to their complexity, are not herein included. However, since the present invention is predominantly an improvement for increasing the efficiency of the converter by reducing the radiation losses therein, the following formula comparing the efficiency of the converter to Carnot efficiency is included.

$$E' = \frac{\eta_c(1-f)}{(\eta_c+2)(1-\theta)} \left[ \frac{1-\theta+\frac{\theta}{\eta_c}\ln\left(\frac{f}{\theta^2}\right)}{1-\frac{f}{(\eta_c+2)}[\eta_c+2^\theta]+\frac{\eta_c}{\eta_c+2}\frac{H_h}{J_c\phi_c}+2(R^{-1}+1)(m_e/m_i)^{1/2}[1-f^\theta]} \right] v-6 \qquad (2)$$

where $\eta_c$ is equal to $e\phi_c/KT_c$ (e is the electronic charge (emv.), $K$=Boltzman's constant, $\phi_c$=cathode bare surface function, $T_c$=cathode temperature, $f$ is the ratio of emitted anode current density to emitted cathode current density, $\theta$ is the ratio of anode temperature to cathode temperature, $H_h$ is the radiant power transfer per unit area from cathode to anode, $J_c$ is the cathode emitted current density, R is the ratio of ions to neutrals emitted from the cathode, and $m_e/m_i$ is the electron to ion mass ratio.

In FIGURE 3, E' is plotted as a function of $T_c$ for $T_a$ equal to 1000° K., $\phi_c$ equal to 3.5 volts, $r$ equal to 0.02, and for the value of $f$ maximizing E'. The ambient vapor is taken as cesium. The corresponding $\phi_a$ (anode work function) of the $f$ maximizing E' is given in the figure for a number of temperatures. FIGURE 3 shows that a heat-shielded, magnetically channeled, plasma heat converter, employing the concept of the present invention, attains a conversion efficiency close to that of Carnot upon application of sufficiently high temperatures.

The present invention more particularly is constructed with the following typical dimensions and operating parameters. The channel width, D, equals 0.030''; the ribbon thickness, $t$, equals 0.00065''; the ribbon width, $w$, equals 0.030''; the wire diameter, $d$ equals 0.005''; the spring 19 outer diameter equals 0.020''. The material employed for the ribbons 18, springs 19, and support plates 21, is tantalum, and aluminum oxide is employed to form the rods 23 and the insulation layers 22 between support plates 21. The average cyclotron radii of electrons emitted isotropically from the cathode at 2000° C. in magnetic fields of 1000 to 5000 gauss are 2.2 and 0.44 mils, respectively.

FIGURE 4 shows an alternative embodiment of the present invention wherein the heat-shield assembly 16, as shown in FIGURE 2, is now defined as a mesh 24, comprising a multiplicity of thin-walled tubes 26 whose axes are aligned parallel to the homogeneous magnetic field 15 of previous mention. The mesh 24 may have various configurations. That is, it may be constructed of thin-walled ceramic tubes, of a series thin-walled, short, metal tubes insulated one from the other, or of sheets of foil with holes therein, insulated one from the other, or loosely held in contact with one another. Thus, the heat conduction along the length of the mesh 24 is as a result negligible. The walls of the tubes 26 of FIGURE 4 are preferably made much thinner than the inner diameters of the tubes. Thus, the mesh system, in conjunction with the magnetic field 15, functions in the same manner as the ribbons 18 of the preferred embodiment. That is, the mesh channels electrons from the cathode 13 to the anode 14, while preventing the transfer of cathode radiation heat losses to the anode. Further heat shielding is provided for the converter by means of an additional mesh strip 27 disposed about the back and sides of the cathode 13.

While the present invention has been disclosed herein with respect to a preferred and an alternative embodiment, it will be apparent that numerous variations and modifications may be made within the spirit and scope of the inven-

What is claimed is:

1. A thermionic heat to electrical current converter comprising:
   (a) an exterior enclosure envelope;
   (b) a generally planar cathode adapted to be heated and generally planar cold anode disposed in spaced parallel facing relation within said envelope;
   (c) permeable heat shield means comprising a multiplicity of thin ribbons supported in close-spaced, side by side relation in multiple sets, and in perpendicular relation to the cathode and anode facing surfaces to define a plurality of generally parallel channels extending between said anode and cathode, said ribbons provided with terminal means for biasing;
   (d) means for supplying cesium vapor within said envelope; and
   (e) means for suppling a homogeneous magnetic field having field lines perpendicular to said anode and cathode and extending through said channels, said magnetic field having an intensity adequate to confine electrons emitted from said cathode to helical paths of a small radius of curvature relative to the spacing of said elements defining said channels.

2. A converter according to claim 1, wherein said heat shield means includes frame means supporting said thin ribbons in thermally and electrically mutually isolated relation in said side by side relation defining said channels.

3. A converter according to claim 1, wherein said heat shield means includes a plurality of support plates provided with thermal and electrical isolation means, and disposed in generally matching coplanar sets to either side of the space between said anode and cathode, said multiple sets of thin ribbon elements disposed in close-spaced, coplanar, side by side relation to define said channels extending between said anode and cathode, spring means coupled to the ends of said ribbons and cooperating with said support plates to retain said ribbons in taut relation between a mating pair of said plates, and insulating rod means disposed in said channels to constrain said ribbons in coplanar relation.

4. A converter according to claim 3, wherein the width of said channels between said ribbons is of the order of about 14 to about 70 orbit diameter of electrons in said magnetic field.

5. A thermionic heat to electrical current converter comprising:
   (a) an exterior enclosure envelope;
   (b) a generally planar cathode adapted to be heated and a generally planar cold anode disposed in spaced parallel facing relation within said envelope;
   (c) permeable heat shield means comprising a plurality of insulated elements arranged as a mesh defining a plurality of parallel linear tubular channels having a diameter of the order of about 14 to about 70 orbit diameters of said electrons in said magnetic field, said tubular channels extending perpendicular to said anode and cathode, said elements having walls defining said channels thinner than the diameter of said channels to inhibit thermal conductivity therealong;
   (d) means for supplying cesium vapor within said envelope; and
   (e) said heat shield means provided with biasing means and means for supplying a homogeneous magnetic field having field lines perpendicular to said anode and cathode and extending through said channels, said magnetic field having an intensity adequate to confine electrons emitted from said cathode to helical paths of a small radius of curvature relative to the spacing of said elements defining said channels.

6. A converter according to claim 5, wherein a second heat shield means comprising a plurality of insulated elements arranged as a mesh defining a plurality of parallel linear channels is disposed on the distal side of said cathode, with said channels in matching relation thereacross.

References Cited by the Examiner
UNITED STATES PATENTS

| | | | |
|---|---|---|---|
| 1,593,373 | 7/1926 | Van der Biji | 310—4 |
| 2,182,736 | 12/1939 | Penning | 313—160 |
| 2,915,652 | 12/1959 | Hatsopoulas | 310—4 |
| 2,953,706 | 9/1960 | Gallet | 310—4 |
| 3,110,823 | 11/1963 | Gabor | 310—4 |
| 3,130,344 | 4/1964 | Baker | 313—204 |

MILTON O. HIRSHFIELD, *Primary Examiner.*

J. W. GIBBS, *Assistant Examiner.*